United States Patent [19]

Gal

[11] Patent Number: 4,857,285
[45] Date of Patent: Aug. 15, 1989

[54] METHOD AND SYSTEM FOR REMOVAL OF SULFUR COMPOUNDS FROM GASES AND FOR REGENERATING SPENT SORBENTS

[75] Inventor: Eli Gal, Lancaster, Pa.

[73] Assignee: General Electric Environmental Services, Inc., Lebanon, Pa.

[21] Appl. No.: 58,060

[22] Filed: Jun. 4, 1987

[51] Int. Cl.⁴ .......................... B01J 8/00; C01B 17/00
[52] U.S. Cl. ...................................... 423/230; 423/244
[58] Field of Search ........... 423/244 A, 244 R, 242 R, 423/242 A, 553, 230

[56] References Cited

U.S. PATENT DOCUMENTS

| | | | |
|---|---|---|---|
| 1,626,664 | 5/1927 | Brady | 423/231 |
| 1,816,533 | 7/1931 | Huff et al. | 423/231 |
| 2,259,409 | 10/1941 | Wenzel | 423/230 |
| 2,682,444 | 6/1954 | Phillipps | 423/231 |
| 2,983,573 | 5/1961 | Moore et al. | 423/231 |
| 4,088,736 | 5/1978 | Courty et al. | 423/244 |
| 4,089,809 | 5/1978 | Farrior, Jr. | 423/231 |
| 4,251,495 | 2/1981 | Deschamps et al. | 502/517 |
| 4,273,749 | 6/1981 | Kimura et al. | 423/231 |
| 4,310,497 | 1/1982 | Deschamps et al. | 423/231 |
| 4,366,131 | 12/1982 | Fox | 423/231 |
| 4,435,371 | 3/1984 | Frech et al. | 423/231 |
| 4,442,078 | 4/1984 | Jalan et al. | 423/231 |
| 4,478,800 | 10/1984 | van der Wal et al. | 423/231 |
| 4,489,047 | 12/1984 | deJong et al. | 502/517 |

FOREIGN PATENT DOCUMENTS

1550354  8/1979  United Kingdom ................ 423/555

OTHER PUBLICATIONS

Harrison et al., "Structural Changes in Metal Oxide Hot Coal Gas Desulfurization Sorbents", 1986 Program Schedule, pp. 221–230, Contract No. DE-RP-21-84MC21166, from Proceedings of the Sixth Annual Contractors Meeting . . . Jun. 1986.
Strickland et al., "The Effect of Temperature and Pressure on the Regeneration of Zinc Ferrite Desulfurization Sorbents" 1985 Program Schedule, pp. 190–212, PTPA Number 5–920.
Flytzani-Stephanopoulos et al., "Detailed Studies of Novel Regenerable Sorbents for High-Temperature Coal-Gas Desulfurization", 1986 Program Schedule, pp. 257–266, Contract Number DE-FC21-85MC22193.

*Primary Examiner*—Gregory A. Heller
*Attorney, Agent, or Firm*—Ernest F. Chapman

[57] ABSTRACT

A method and system for removing hydrogen sulfide from a hot gas. In a moving bed absorber, sulfur compounds in the hot gas moving in a direction which is countercurrent to the direction of movement of the movable bed of metal oxide, react with metal oxide to form metal sulfide. The metal sulfide is regenerated to re-usable metal oxide in a moving bed regenerator. The regeneration is carried out with an oxygen-containing gas in which regenerator off-gas serves as a diluent to control oxygen concentration. In the regenerator, spent metal sulfide moves progressively through a single regeneration vessel having first, second and third regeneration stages. In the first and second regeneration stages, first and second oxygen and sulfur dioxide-containing gases move, respectively, in a direction which is cocurrent with the direction of movement of a movable bed of spent metal sulfide. In the third regeneration stage, an oxygen-containing gas moves in a direction which is countercurrent to the direction of movement of the movable bed of metal sulfide from the second regeneration stage. The combined gases derived from the first, second and third regeneration stges and which are rich in sulfur dioxide and lean in oxygen, are removed from the regenerator as off-gas and used as diluent with air, oxygen-enriched air or pure oxygen to provide the low oxygen concentration in the oxygen-containing gas introduced into the first and second regeneration stages.

44 Claims, 1 Drawing Sheet

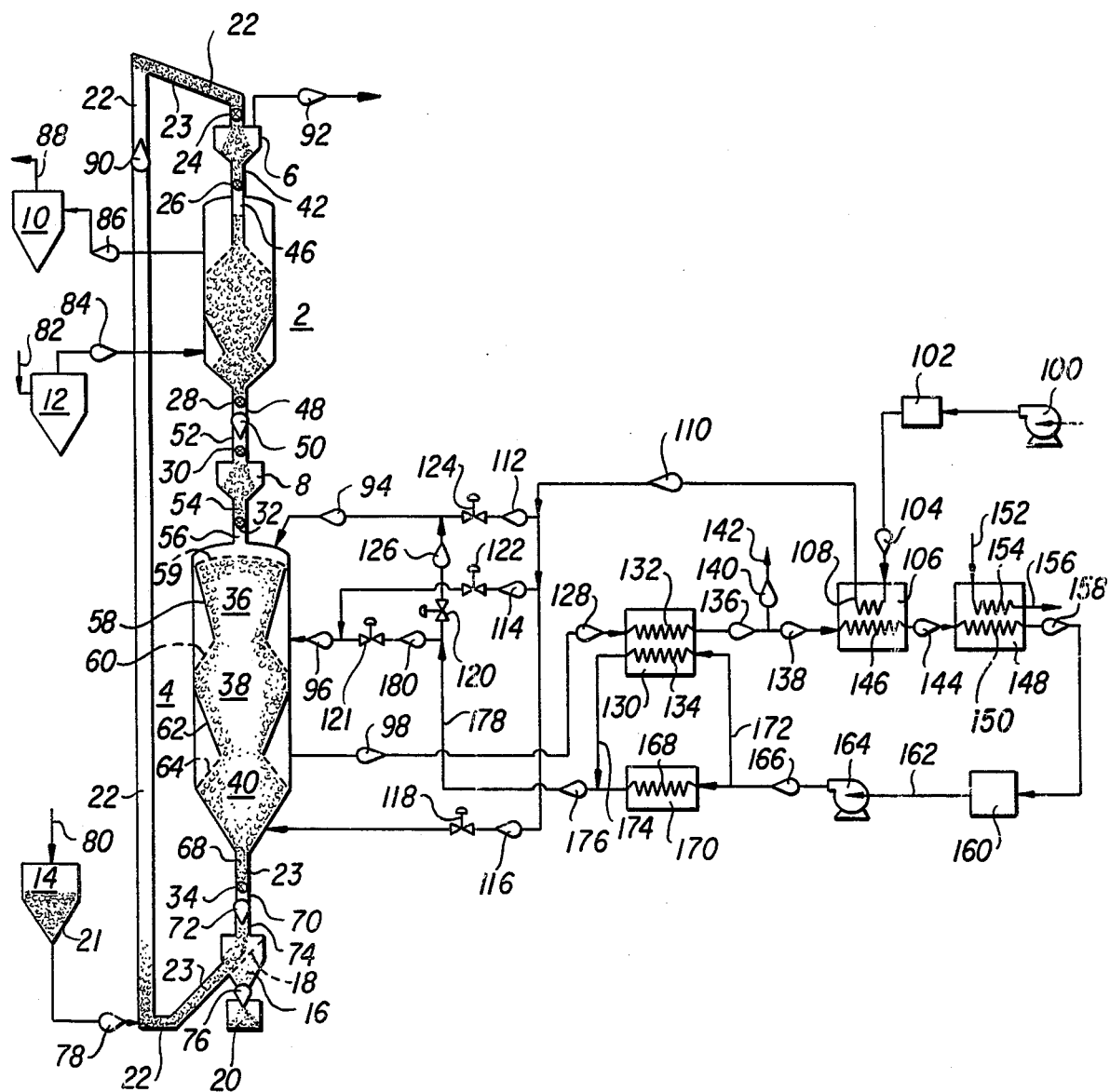

METHOD AND SYSTEM FOR REMOVAL OF SULFUR COMPOUNDS FROM GASES AND FOR REGENERATING SPENT SORBENTS

BACKGROUND OF THE INVENTION

This invention relates to the removal of sulfur compounds from gases, and more particularly, to a method and system for the removal of sulfur compounds from gases using sorbents and to the regeneration and recycling of spent sorbents in a moving bed process and system.

Gases which contain sulfur compounds, such as gases that are derived from coal gasification techniques, have been of considerable interest as a source of gas for use in various systems and industrial applications. Since such gases contain sulfur compounds, in order to meet environmental standards and to prevent damage to equipment, it is necessary to remove the sulfur compounds from the gases.

The sulfur compounds in such gases generally include primarily hydrogen sulfide ($H_2S$) and, in lesser amounts, carbonyl sulfide (COS) and the like. For example, untreated coal gas generally contains about 1,000 to about 6,000 ppmw of $H_2S$, COS and other compounds, depending on the sulfur content of the coal from which the coal gas is derived. At least 90 percent of these sulfur compounds should be removed to meet current environmental and emission standards for utility power generation operating with medium to high sulfur coal.

Integrated coal gasification/combined cycle (IGCC) power generation is an extremely attractive alternative for coal-based production of energy. In the IGCC process, coal is gasified with air (or oxygen) and steam to produce a combustible gas comprising principally carbon monoxide, carbon dioxide, hydrogen, methane, water vapor and nitrogen (when air is used as the oxidant), and also containing minor amounts of other gaseous species. The coal gas is purified to remove species such as particulate matter, alkali metals, and sulfur compounds, principally hydrogen sulfide as discussed above, which are harmful to the generating equipment and/or to the environment.

Coal-derived fuel gas leaves the gasifier at temperatures higher than 500° C. Numerous methods for removing hydrogen sulfide at temperatures below about 200° C. are commercially available and have been demonstrated for IGCC applications. However, since the coal-derived fuel gas is produced at significantly higher temperatures, large-scale cooling and processing are necessary to reduce the temperature of the coal-derived fuel gas to that required for these numerous prior art methods for desulfurization. Energy efficiency losses and significant process complexity and cost result from the necessity to cool the coal gas. The cooling, cleaning and reheating of the coal-derived fuel gas itself is thermodynamically inefficient and requires costly heat exchangers.

An alternative approach for cleaning the coal gas is to remove the hydrogen sulfide and other compounds at the coal gasifier exit temperature or with little or no cooling. This requires the development of desulfurization processes capable of operation at 500°–700° C. The desirable high temperature desulfurization process requires no cooling of the fuel gas, and therefore, the thermodynamic penalties and process complexities associated with low temperature desulfurization are avoided. Even though high sulfur removal efficiency has been achieved, hot coal-derived fuel gas desulfurization has failed to gain commercial acceptance because of potential high cost as well as numerous technical and operational drawbacks and disadvantages. In the prior art processes and systems, metal oxides such as iron, copper, zinc and vanadium oxides, mixed metal oxides such as zinc and copper ferrites and metal oxide blends have been found to be effective for this purpose. They have also been found to remove carbonyl sulfide (COS), the minor sulfur compound. These metal oxide species are referred to herein and in the appended claims as metal oxide sorbent, regenerated metal oxide, re-usable metal oxide, sorbent which reacts with sulfur compounds, and sorbent, all of which may be used interchangeably herein.

Hot gas desulfurization processes generally involve contacting the sorbent, such as a metal oxide, with the hot gas, such as hot coal gas, to form metal sulfides. The metal sulfides are referred to herein as sulfided sorbent, sulfur-rich metal sorbent, spent metal-sulfur compound, sulfur-rich sorbent, and spent sorbent, all of which may be used interchangeably herein. The net sulfur sorption reaction is:

$$H_2S + MO = MS + H_2O \qquad (I)$$

wherein M is the metal present in the sorbent; MO represents the metal oxide; and MS represents the metal sulfide. For the sake of simplicity, M is represented as divalent, but it will be apparent that metals in other valence states may also be employed. Also, since the actual proportion of sulfur in the metal sulfide usually varies from theoretical, these equations may not accurately represent the stoichiometry of the reactions.

Following the absorption reaction, that is, the reaction in the absorber, the sulfided sorbent is regenerated to recover metal oxide. It is apparent that during this regeneration, sulfur compounds will be evolved and must be controlled in order not to cause additional pollution problems. Many processes have been devised to recover such sulfur compounds and to produce such products as sulfuric acid, gypsum, ammonium sulfate, elemental sulfur, and the like.

The standard approach to the regeneration of this sulfided sorbent is oxidation or roasting, to yield the metal oxide and either elemental sulfur or sulfur dioxide. As used herein, the regenerated metal oxide is referred to as metal oxide, re-usable metal oxide, regenerated metal oxide, re-usable sulfur-depleted sorbent and regenerated sorbent, all of which may be used interchangeably herein. The regeneration reaction may be represented by the following equation:

$$2MS + 3O_2 = 2MO + 2SO_2 \qquad (II)$$

wherein M, MS and MO are as defined above.

In the prior art processes, the concentration of sulfur dioxide in the regenerator off-gas is ordinarily low, typically less than about 3% and may be removed by using conventional methods.

Depending on the regeneration conditions, the oxidation reaction in the regenerator may be accompanied by the undesirable formation of metal sulfate. This may be represented by the following reaction:

$$MS + 2O_2 = MSO_4 \qquad (III)$$

Hot gas desulfurization processes have been developed mainly by or for the U.S. Department of Energy. Most prior art processes and configurations utilize two fixed bed reactors, each containing pellets of metal oxide or metal sulfide and each operating alternately in an absorption or regeneration mode. The prior art processes using fixed bed reactors are disadvantageous, not only for the reasons stated above, but also because they are of a non-continuous, non-steady state operation where the reaction zone is not confined to one location in the reactor but it moves as the reaction progresses. Furthermore, in the prior art systems, contaminated sorbent removal requires system shut down. Further, in the prior art fixed bed systems, pressure drop increases during the absorption reaction due to the accumulation of particulate matter in the bed. A non-steady flow of regenerator off-gas results in more costly sulfur dioxide treatment in many of the prior art fixed bed systems, and both reactors in the fixed bed systems must be designed to withstand both oxidizing and reducing atmospheres at the high pressure of the absorber and the high temperature of the regenerator in alternate modes of absorption and regeneration. In the prior art systems, it is necessary to cool the highly exothermic regeneration reaction, and this requires significant dilution of the regeneration gas by an inert gas, such as steam or nitrogen, thereby having thermal and economic penalties to the process. This dilution of the regeneration gas results in a low sulfur dioxide concentration and increases the cost of treatment of the regenerator off-gas. Furthermore, in the prior art processes, the oxidation of metal sulfides may be accompanied by undesirable formation of metal sulfate. The metal sulfate remains with the regenerated sorbent, and the metal sulfate subsequently decomposes under the reducing conditions in the absorption reaction, thereby releasing sulfur dioxide into the coal-derived fuel gas and reducing the overall sulfur removal efficiency.

SUMMARY OF THE INVENTION

It is the primary object of the present invention to provide an economical method and system for the desulfurization of hot gas streams.

A further object of the present invention is to provide a method and system which continuously removes hydrogen sulfide and other sulfur-containing compounds from hot gases with metal oxide sorbents while simultaneously regenerating sulfur-containing sorbents.

A still further object of the present invention is to provide a method and system which produces a high concentration of sulfur-containing off-gas with sulfur species distributed therein which favor the recovery of and/or the re-use of the sulfur compounds.

Still another object of the present invention is to provide a method and system for the regeneration of sulfur-containing sorbents.

A still further object of the present invention is to provide a method and system which continuously removes hydrogen sulfide and other sulfur-containing compounds from hot gases with metal oxide sorbents while regenerating sulfur-containing sorbents.

It is another object of the present invention to provide a method and system for controlling the temperature of oxidative regeneration of sulfur-containing sorbents to minimize sintering and other thermal damages to the sorbent so that the sorbent can be reused over many absorption and regeneration cycles.

It is still another object of the present invention to provide a method and system for controlling the temperature of oxidative regeneration of sulfur-containing sorbents with minimal external cooling and with no external diluent.

Another object of the invention is to provide a method and system for the decomposition and removal of sulfate compounds formed during the regeneration of sulfur-containing sorbents.

These and other objects of the invention are achieved in a system having a moving bed absorber in which metal oxides react with sulfur compounds in the hot gas to form metal sulfides, and a moving bed regenerator in which the metal sulfides are oxidatively regenerated to metal oxides. Optionally, sulfate decomposition and removal is achieved by passing hot desulfurized gas through regenerated metal oxide.

In accordance with the objects of the present invention, the oxidative regeneration of the metal sulfides, that is, the regeneration of the sulfur-rich or spent sorbent, is carried out in three regeneration zones or phases at controlled oxygen concentration where a cooled, recycled regenerated off-gas serves as a diluent in the source of oxygen used in the oxidation of the sulfur rich or spent sorbent. In preferred embodiments, the temperature in the various regeneration zones is determined by the oxygen concentration of the oxgen-containing gas used in the oxidative regeneration and is controlled by the ratio of air, oxygen-enriched air or pure oxygen to diluent.

In one aspect of the present invention, there is provided a method for removing gaseous sulfur compounds from a hot gas by (a) contacting the hot gas with at least one metal oxide sorbent in a bed of metal oxide sorbent which is movable in a direction countercurrently to the hot gas, whereby the metal oxide sorbent reacts with the hydrogen sulfide and other sulfide compounds to form a spent or sulfur-rich metal sorbent and a hot gas lean in or depleted of sulfur compounds; (b) removing the hot gas lean in sulfur from the bed of metal oxide sorbent; (c) contacting the sulfur-rich metal sorbent with a first oxygen-containing gas which moves cocurrently in the direction of a movable bed of the sulfur-rich metal absorber in a first phase regeneration to convert, in an exothermic reaction, sulfur-rich metal sorbent to a partially-sulfided sorbent (partially spent metal-sulfur compound), thereby forming a sulfur dioxide-containing gas; (d) contacting the partially-sulfided sorbent with a second oxygen-containing gas which moves co-currently in the direction of a movable bed of the partially-sulfided sorbent in a second phase regeneration to convert, in an exothermic reaction, the partially-sulfided sorbent to regenerated or re-usable metal oxide and thereby forming additional sulfur dioxide-containing gas, the first oxygen-containing gas having a concentration of oxygen which is less than the concentration of oxygen in the second oxygen-containing gas; (e) contacting the regenerated metal oxide with air, oxygen-enriched air or oxgen which moves countercurrently to the direction of a movable bed of the regenerated metal oxide to ensure completion of regeneration, to cool the regenerated metal oxide and to purge the regenerated metal oxide of sulfur dioxide-containing gas; (f) removing the sulfur dioxide-containing gas purged from the regenerated metal oxide; and (g) re-using the regenerated metal oxide in step (a). Optionally, as discussed above, a slip stream of the hot gas lean in sulfur compounds is passed through regenerated metal oxide whereby residual metal sulfate compounds in the regenerated metal oxide are decomposed, and oxidized regenerated metal oxide is chemically reduced.

In preferred embodiments of the present invention, the oxygen concentration of the first oxygen-containing gas and the second oxygen-containing gas is controlled with cooled, sulfur dioxide-containing gas, also indentified herein as off-gas, purged from the regenerated metal oxide.

By the process and system of the present invention, it is possible to remove at least about 90% of the gaseous sulfur compounds from hot gases containing gaseous sulfur compounds, for example, in a hot coal gas derived from a coal gasification process wherein the hot coal gas contains primarily hydrogen sulfide, COS and other sulfur compounds in lesser quantities. In the regeneration process and system of the present invention, the temperature of the highly exothermic regeneration reaction is controlled by cooling and recirculating controlled amounts of the off-gas in the oxidizing gas which is generally air, oxygen-enriched air, or in certain embodiments, pure oxygen. The heat removed from the off-gas can be used to produce high temperature steam, thus turning the system into a useful heat producing process rather than a heat consuming process typical of many of the prior art systems and processes. Furthermore, by using the regeneration off-gas as a diluent in air or other oxygen-containing, oxidizer gas for the oxidation of the spent or sulfur-rich sorbent, a $SO_2$-rich off-gas (above about 10% $SO_2$) is produced. This $SO_2$-rich off-gas is cost effective for recovery as elemental sulfur, sulfuric acid or sulfate salt.

Other objects and advantages of the process and system of the present invention will be apparent from the accompanying drawing and the following detailed description of the invention.

BRIEF DESCRIPTION OF THE DRAWING

The drawing represents a cross-sectional diagrammatic representation of the system of the present invention.

DETAILED DESCRIPTION OF THE INVENTION

The metal which may be combined as sulfides or oxides in the present invention, i.e., the metals the sulfides or oxides of which form the sorbents of the present invention, are well-known in the art and include the transition metals, preferably, copper, zinc, iron, nickel, chromium, vanadium, tungsten or mixtures thereof. Other metals which may be combined as oxides or sulfides, and in the oxide or ferrite form, used as the sorbent in the process and system of the present invention, include the group IIA alkaline earth metals, including strontium, calcium and barium as taught in U.S. Pat. No. 4,442,078 which is incorporated herein by reference. The preferred metal oxides or sorbents which may be used in the process and system of the present invention, are the metal oxides selected from the group consisting of iron oxide, zinc oxide, zinc ferrite, copper ferrite, copper oxide and vanadium oxide. These are generally preferred by reason of their high efficiency in hydrogen sulfide removal, easy regenerability with air or oxygen and low cost. As used herein, the term, metal oxides, also includes mixtures of the foregoing, as well as other metal oxide compounds such as, copper aluminate, copper ferrite aluminate, copper molybdenum aluminate and the like.

Generally, the sorbent used in the process and the system of the present invention, is one which is capable of removing the sulfur-containing gases from hot gases, and accordingly, the sorbent must be capable of withstanding the temperatures of the hot gas. In certain instances, when the sulfur-containing gas is in hot coal gas, the hot coal gas typically has a temperature of at least about 400° C., and the temperature at which the hot gas contacts the metal oxide sorbent, is the temperature of the hot gas.

The sorbents must also be capable of withstanding the high temperatures of regeneration in the regenerator. Since the regeneration is carried out in the regenerator by contacting the sulfur-rich sorbent, generally in the metal sulfide form, with air, oxygen-enriched air or pure oxygen, as shown in equation (II) above, an exothermic reaction occurs, thereby increasing the risk of sintering of the sorbent material, such as the metal sulfide or regenerated metal oxide.

To minimize sintering and other thermal damages to the sorbent so that it can be reused over many (for example 100 or more) absorption-regeneration cycles, temperature control must be maintained throughout the regenerator reactor. Temperature control is achieved through staged regeneration and by controlling the inlet temperature and the inlet oxygen concentration of the oxygen-containing gas of each regeneration stage. Oxidation reaction rate of fully-sulfided or mostly-sulfided sorbent in the first regeneration stage is very highly resulting in a high rate of heat generation and consequently, in a significant increase in gas temperature, and furthermore, in a significant difference in temperature between the regenerating oxygen-containing gas and the sorbent. The temperature of the sorbent is higher than the temperature of the gas. To prevent sorbent sintering, it is critical to maintain a sufficiently low gas temperature (by controlling the oxygen concentration in the oxygen-containing gas as discussed above) so that the sorbent temperature remains below its sintering temperature. Typical oxygen concentration in the first regeneration stage inlet is about 2 to 4 percent, and the gas temperature is controlled at about 100°–200° C. below the sintering temperature of the sorbent. Oxidation reaction rate of the partially-sulfided sorbent in the second regeneration stage is lower resulting in a significant increase in gas temperature but in only a small temperature difference between the temperature of the regenerating oxygen-containing gas and the sorbent. Typical oxygen concentration in second stage regeneration inlet is about 4 to 6 percent, and the gas temperature is controlled at about 50°–100° C. below the sintering temperature of the sorbent.

The physical form, shape and size of the sorbents used in the process and system of the present invention are not critical as long as the sorbent has the absorption reaction and regeneration characteristics described above, and as long as it can be moved or propelled continuously or intermittently through the system. The preferred sorbent is in the form of pellets, however, granular, spherical, particulate and other geometrical forms can be used in the present process and system. Although fine powders or finely-divided particles can be used, they are not practical because of dust problems. Typically, the sorbent particles should be of a size sufficiently large so that the particles are not entrained by the gas streams. In preferred systems and processes, the finely-divided sorbent particles are removed from the system by appropriate means, such as classification, for example, by passing the sorbent at any stage of the system over a screen of appropriate mesh size to remove the fines. As indicated above, the size of the sorbent material is not critical, however, in preferred embodiments, the size of the sorbent is about 0.5 mm to about 6.0 mm, and in the most preferred embodiments, the size is about 1.6 mm to about 4.7 mm. The sorbent may be porous or non-porous as desired, and optionally it may be used in conjunction with inert carriers and other substances, or it may be deposited in various forms on inert particles. In the most preferred embodiments, the sorbent is porous with only a small fraction of inert carrier or binder in order to maximize the sulfur absorption capacity.

Typically, the gas to be desulfurized is contacted countercurrently in an absorber in a continuous process through a movable bed of the sorbent. It is most desirable to operate the process and system of the present invention in a continuous or intermittent mode, that is, one wherein the metal oxide sorbent moves continuously or intermittently through the absorber and/or through the regenerator.

In the process and system of the present invention, the net sulfur sorption reaction is represented by equation (I) above. In one typical reaction using zinc oxide as the absorber, the net sulfur sorption reaction is:

$$ZnO + H_2S = ZnS + H_2O \qquad (IV).$$

When iron oxide is the sorbent in the absorber, the typical sulfur sorption reaction is:

$$Fe_2O_3 + 2H_2S + H_2 = 2FeS + 3H_2O \qquad (V).$$

When zinc ferrite is the sorbent in the absorber, the typical sulfur sorption reaction is:

$$ZnFe_2O_4 + 3H_2S + H_2 + ZnS + 2FeS + H_2O \qquad (VI).$$

These are typically regenerated in the two-phase regeneration of the present invention from the zinc sulfide form to the zinc oxide form and from the iron sulfide form to the iron oxide form as shown generally in equation (II) above. Equations (IV), (V) and (VI) are typical metal oxide sorbent reactions with hydrogen sulfide wherein sulfur-rich metal sorbents are formed leaving a hot gas lean in sulfur compounds. The hot gas lean in sulfur compounds is removed from the movable bed of metal oxide sorbent.

The sulfur-rich metal sorbent or spent metal sorbent is removed from the absorber, preferably through a lock hopper discussed in more detail below, to a regenerator where it is contacted with oxygen or an oxygen-containing gas to regenerate the sulfur-rich metal sorbent or spent sorbent to a reusable or regenerated metal oxide or regenerated sorbent. Typically, the sulfur-rich metal sorbent passes into the top of the absorber into a first phase regeneration zone where a first oxygen-containing gas moves co-currently in the direction in which the bed of the sulfur-rich metal sorbent moves. In this first phase regeneration zone, a part of the sulfur-rich metal sorbent is converted to a partially-sulfided metal sorbent, and sulfur dioxide-containing gas is formed. The remainder of the sulfur-rich metal sorbent, i.e., the partially-sulfided metal sorbent along with the sulfur dioxide-containing gas formed in the first phase, moves into a second phase regeneration zone in the regenerator, typically located below the first phase regeneration zone of the regenerator, and a second oxygen-containing gas moves co-currently in the direction in which the bed of the partially-sulfided metal sorbent moves. The second oxygen-containing gas converts substantially all of the remainder of the sulfur-rich metal sorbent, i.e., the partially-sulfided metal sorbent, to regenerated metal oxide and forms additional sulfur dioxide-containing gas.

The regenerated metal oxide passes to a third zone in the regenerator where any sulfided metal sorbent remaining in the bed is converted to regenerated metal oxide, i.e., to complete regeneration of the spent sorbent; where the regenerated metal oxide is cooled; and where regenerated metal oxide is purged of sulfur dioxide-containing gas with air, oxygen-enriched air or pure oxygen, otherwise defined herein as a cooling and purging medium. In the third stage or zone in the regenerator, typically located below the second phase regeneration zone or stage, the regenerating, cooling and purging medium, preferably air, oxygen-enriched air or pure oxygen, is introduced into the bottom of the regenerator, that is, into the lower end of the third stage or zone, and passes upwardly, that is, countercurrently to the direction of the movement of the movable bed of regenerated metal oxide. In preferred embodiments of the present invention, all of the gases which enter the regenerator and all of the gases which are formed in the regenerator, exit the regenerator at a point located at the lower end of the second regeneration stage and/or the upper end of the third stage or phase. Alternatively stated, the gases exit the regenerator at a suitable point in the regenerator where the co-current streams of gas from the first phase or stage and the second phase or stage meet the countercurrently-flowing gas from the third stage or zone. This stream of gas is identified herein as the regenerator off-gas, as sulfur dioxide-containing gas purged from the regenerated metal oxide or the gaseous sulfur compounds removed from the regenerator. At least one gas outlet is provided for removing from the regenerator the gas from the two gas inlets which gas flows in a direction co-current with the movable bed in the first and second regeneration stages and the gas from the gas inlet which gas flows in a direction countercurrent to the direction of the movable bed in the third regeneration stage. In the process and system of the present invention, the gases are combined within the regenerator and pass out of the regenerator in a single gas outlet.

The regenerated metal oxide is removed from the bottom of the regenerator and is re-used in the absorber for additional removal of hydrogen sulfide and other sulfur compounds from hot gases.

In order to provide the necessary temperature control, optimal oxygen concentration and optimal regenerator vessel size, it is critical in the process and system of the present invention that the movable bed passes through a regenerator having three stages or zones as discussed above, namely, a first regeneration stage or zone, a second regeneration stage or zone and a third regeneration, cooling and purging stage or zone. The total volumetric flow of oxygen to the regenerator is slightly higher (typically by about 1 to 5 percent) than the volumetric flow of oxygen required for complete regeneration of the sulfided sorbent. The oxygen concentration of the oxygen-containing gas is the ratio of the total volumetric flow of oxygen to the total volumetric flow of the oxygen-containing gas. As can be seen by one skilled in the art, low oxygen concentration in the oxygen-containing gas requires high volumetric flow rate of the oxygen-containing gas through the regenerator, thus resulting in an increased size of the regenerator vessel, an increased size of the gas handling equipment (such as pipes, valves, heat exchangers, compressors) and an increase in the power required to feed the diluent into the regenerator. Staged regeneration of the present invention allows the optimization of oxygen concentration in the various oxygen-containing gas streams thus minimizing the cost of the regeneration system. That is, in the first stage regeneration, where the rate of oxidation reaction is the highest and temperature rises quickly, the oxygen is maintained at a low concentration. In the second stage regeneration, the rate of oxidation reaction is lower allowing the use of higher oxygen concentration in the oxygen-containing gas. In the third stage when oxidation is complete or almost complete, a stream containing very high oxygen concentration (as high as about 20 to 100%) can be used. In the preferred embodiment of the present invention, the first zone is located in approximately the top one-third of the regenerator vessel and merges into the second stage or zone which is located in the mid one-third of the regenerator or vessel which zone or stage merges into the third regeneration, cooling or purging stage or zone of the regenerator vessel. The relative size of each stage or zone in the regenerator is not critical as long as the first regeneration stage or phase is of suitable size to permit the formation of gaseous sulfur compound and the regeneration of a first part of the spent sorbent leaving a partially spent metal-sulfur compound from the treatment of the spent metal-sulfur compound by subjecting the spent metal-sulfur compound in the first stage to the first oxygen-containing gas where the exothermic reaction is controlled so that the temperature within the first stage does not exceed the sintering temperature of the metal-sulfur compound (spent sorbent) or the partially spent metal-sulfur compound. As used herein, a partially spent metal-sulfur compound is the sorbent compound wherein the spent sorbent has been partially regenerated to the oxide form, and the remainder of the spent sorbent is partially in the spent form. The first stage or zone is also of a suitable size to permit the occurrence of the reaction of equation (II) above with a first oxygen-containing gas having a concentration of oxygen which is less than the oxygen concentration of a second oxygen-containing gas which passes into the sorbent being regenerated in the second stage or zone of the regenerator. Thus, the first zone or stage is of sufficient size to permit the exothermic reaction to proceed between the spent sorbent and the oxygen in the first-oxygen-containing gas, which as discussed in more detail below, is controlled so that the temperature in the first phase of stage of regeneration is maintained at a pre-selected temperature below the sintering temperature of the various forms of sorbent therein.

The size of the second phase or stage of the regenerator is not critical as long as there is a sufficient amount of contact between the partially-sulfided metal sorbent, that is, the remainder of the spent sorbent which has not been regenerated in the first stage, with the second oxygen-containing gas to completely or substantially completely regenerate the remainder of the spent sorbent. Thus, the second stage or phase of the regenerator must be of a size sufficient to permit the completion of the conversion of the spent sorbent to resuable sorbent or reusable metal oxide in the presence of the second oxygen-containing gas wherein the concentration of oxygen is greater than the concentration of oxygen in the first oxygen-containing gas. It is also necessary to maintain the temperature in the second phase or stage regenertion below the sintering temperature of the various forms of sorbent in the second stage or zone of the regenerator.

The size of the third stage of the regenerator is not critical as long as there is a sufficient amount of cooling and purging of the sorbent within the zone, and as long as any spent sorbent remaining in the bed is completely regenerated. In preferred embodiments, the movable bed of sorbent is cooled to a temperature which is sufficiently low to prevent damage to downstream equipment. It is critical in the process and system of the present invention that the regeneration of the spent sorbent be accomplished in two stages or phases to control the exothermic reaction of the regeneration and to maintain the temperature of the spent sorbent below its sintering temperature, as discussed above. The temperature of the sorbent in the first stage regeneration is significantly highly than the temperature of the gas due to the high rate of the exothermic reaction and consequently, the high rate of heat generation of the fully-sulfided or mostly-sulfided (spent) sorbent. The temperature of the sorbent in the second stage regeneration is slightly higher than the temperature of the gas due to the slower rate of reaction of the partially-sulfided sorbent. Temperature control is generally accomplished in accordance with the present invention by providing a first oxygen-containing gas having a concentration of oxygen which is less than the concentration of oxygen in the second oxygen-containing gas used in the first and second stages or zones respectively, of the regenerator. This is achieved by providing a system with means to control the amount of oxygen contacting the spent sorbent and thereby control heat generated by the reaction between the oxygen and the spent sorbent in the first and second regeneration stages. In accordance with the present invention, and for the reasons discussed above, this is achieved by maintaining a lower gas temperature in the first stage than in the second stage.

The amount of oxygen in the first oxygen-containing gas which moves co-currently in the direction of the movable bed of the sorbent in the first phase regeneration, must be sufficient to convert a sulfur-rich sorbent to a partially-sulfided metal sorbent. The amount of oxygen in the second oxygen-containing gas which moves co-currently in the direction of the movable bed of sorbent in the second phase regeneration, must be sufficient to complete or substantially complete the conversion of the remainder of the sulfided sorbent to the regenerated metal oxide form.

In the process and system of the present invention, in one preferred mode, the first oxygen-containing gas has a concentration of oxygen which is less than the stoichiometric concentration of oxygen required to convert completely the spent sorbent to metal oxide and sulfur dioxide as shown in equation (II) above. Thus, there would be an insufficient amount of oxygen to convert all of the spent sorbent to metal oxide in the first stage or zone of the regenerator. For example, about 1/5 to about $\frac{1}{3}$ of the spent sorbent would be converted to resuable metal oxide in the first stage or zone. Correspondingly, in the second stage or zone of the regenerator, there is at least a stoichiometric amount of oxygen introduced therein, and preferably an excess of oxygen, to convert all of the remaining spent sorbent to reusable metal oxide and to release all of the sulfur compound absorbed on the metal compound to sulfur dioxide. For example, the remaining 4/5 to ⅔ of the spent sorbent would be converted to reusable metal oxide in the second stage or zone. However, as discussed above provision is made in the third stage or zone of the regenerator to convert any spent sorbent remaining from the first and second stages or zones to reusable metal oxide.

In accordance with preferred embodiments of the present invention, the oxygen concentration in both the oxygen-containing gas introduced into the first phase regeneration and introduced into the second phase regeneration is controlled by introducing a diluent into the source of oxygen-containing gas. Thus, when, for example, the source of oxygen-containing gas is air, oxygen-enriched air or pure oxygen, a suitable diluent is introduced into the oxygen-containing gas to provide the desired concentration of oxygen for the respective phases or zones. In the most preferred embodiments of the present invention, the diluent is the sulfur dioxide-containing gas purged from the regenerated metal oxide and removed from the gas outlet of the regenerator. Thus, the sulfur dioxide-containing gas purged from the regenerated metal oxide is selectively added to the source of oxygen-containing gas for the first phase regeneration and for the second phase regeneration, respectively. For example, sulfur dioxide-containing gas purged from the regenerated metal oxide is added to the source of oxygen-containing gas, and the volume flow ratio is selectively maintained between the source of oxygen-containing gas and the sulfur dioxide-containing gas purged from the regenerated metal oxide to provide a sufficient amount of oxygen in the first oxygen-containing gas to maintain the temperature of the exothermic reaction in the first phase regeneration, specifically the temperature of the sorbent, which is higher than the temperature of the gas, below the sintering temperature of the sorbent, for example, to maintain the maximum temperature of the gas in the first phase regeneration at about 700° C. when sintering temperature of the sorbent is about 850° C. In certain preferred embodiments, the oxygen concentration in this stage is reduced to about 2 to about 4 percent (by volume) with the sulfur dioxide-containing off-gas. Furthermore, sulfur dioxide-containing gas purged from the regenerated metal oxide is added to a source of oxygen-containing gas, such as air, oxygen-enriched air or pure oxygen, and the volume flow ratio between the oxygen-containing gas and the sulfur dioxide-containing gas purged from the regenerated metal oxide is selectively maintained to provide a sufficient amount of oxygen in the second oxygen-containing gas to maintain the temperature of the exothermic reaction in the second phase regeneration below the sintering temperature of the sorbent, for example, to maintain the maximum temperature of the gas in the second phase regeneration at about 800° C. when the sintering temperature of the sorbent is about 850° C. In certain preferred embodiments, the oxygen concentration in the second stage is reduced to about 2 to about 6 percent or higher (by volume) with the sulfur dioxide off-gas.

When the oxygen concentration of the first oxygen-containing gas and the oxygen concentration of the second oxygen-containing gas is controlled by adding sulfur dioxide-containing gas purged from the regenerated metal oxide, it is preferred that the sulfur dioxide-containing gas purged from the regenerator be cooled by any suitable means so that the inlet gas temperature of the first oxygen-containing gas and the inlet gas temperature of the second oxygen-containing gas is about 400° C. to about 500° C. As explained above, the sulfur dioxide-containing gas purged from the regenerated metal oxide is a mixture of the sulfur dioxide-containing gas from the first phase regeneration, the sulfur dioxide-containing gas from the second phase regeneration and the air, oxygen-enriched air or pure oxygen used to cool the regenerated metal oxide, to complete regeneration and to purge the regenerated metal oxide of sulfur dioxide-containing gas. In preferred aspects of the present invention, this gas purged from the regenerator contains about 10 to about 13 percent sulfur dioxide when air is used as the source of oxygen-containing gas. An example of an oxygen-enriched air is a gas having about 40% oxygen and 60% nitrogen. When pure oxygen is used as the source of oxygen-containing gas, the gas purged from the regenerator contains up to about 100% sulfur dioxide. Thus, increasing the amount of oxygen in the oxygen-containing gas, increases the amount of sulfur dioxide purged from the regenerator. The amount of sulfur dioxide purged from the regenerator varies from that described above for air up to that described above for pure oxygen. Varying concentrations of oxygen-enriched air intermediate air and pure oxygen may be used to provide varying concentrations of sulfur dioxide gas between about 10–13% and about 100% purged from the absorber.

In view of the foregoing, it can be seen that one of the preferred aspects of the present invention is a method of converting a spent metal-sulfur compound to a re-usable metal oxide by moving a bed of the spent metal-sulfur compound progressively through a single regeneration vessel having a first regeneration stage, a second regeneration stage and a third regeneration, cooling and purging stage.

In another aspect of the present invention, there is provided a system for the desulfurization of hot gases with sorbent which reacts with sulfur compounds in the hot gas. In the system, an absorber fed, for example, by gravity has means for feeding the sorbent into the top of the absorber, means for moving a bed of sorbent through the absorber in contact with the hot gas containing sulfur compounds and means for introducing the hot gases containing sulfur compounds into the absorber and for withdrawing hot gas having sulfur compounds removed therefrom in such a manner that the hot gases move in a direction countercurrent to the direction of movement of the moving bed. The system also embraces a regenerator fed, for example, by gravity, having a first regeneration stage, a second regeneration stage and a third stage for regeneration, cooling and purging in a single vessel.

Means are provided for feeding spent sorbent (spent metal-sulfur compound) from the absorber to the first regeneration stage of the regenerator and for moving the bed of spent sorbent from the first regeneration stage to the second regeneration stage and thereafter to the third stage for cooling, purging and completion of regeneration. The means for moving the beds of sorbent through the absorber and regenerator are not critical. In preferred embodiments the beds of sorbent are moved by gravity. However, pressure means, such as air pressure, pneumatic devices, elevators, screws and various other mechanical means may be used to propel, continuously or intermittently, the beds of sorbent throughout the system.

A gas inlet is provided for adding an oxygen-containing gas to the first regeneration stage so that the oxygen-containing gas can contact the spent sorbent and thereby regenerate at least part of the spent sorbent, the oxygen-containing gas being added to the first regeneration stage to provide a flow of oxygen-containing gas in a direction which is co-current with the direction of flow of the spent sorbent, and means such as metering means, are provided to control the amount and concentration of oxygen contacting the spent sorbent (spent metal-sulfur compound) and thereby control heat generated by reaction between the oxygen and the spent sorbent in the first regeneration stage. A gas inlet is provided for adding an oxygen-containing gas to the second regeneration stage to contact the spent sorbent and thereby form a bed of regenerated sorbent, the oxygen-containing gas being added to the second regeneration stage to provide a flow of oxygen-containing gas in a direction which is co-current with the direction of flow of the spent sorbent in the second regeneration stage, and means such as, metering means, are provided to control the amount and concentration of oxygen contacting the spent sorbent and thereby control heat generated by reaction between the oxygen and the spent sorbent in the second regeneration stage.

A gas inlet is provided for passing an oxygen-containing gas into the third stage for completing regeneration and for cooling and purging regenerated sorbent therein, the oxygen-containing gas being added to the third stage to provide a flow of oxygen-containing gas in a direction countercurrent to the direction of flow of the movable bed of regenerated sorbent. Although only one gas inlet is preferred for each stage, it is possible to provide a plurality of gas inlets in the system of the present invention. The system has at least one gas outlet for removing from the regenerator the gas from the two gas inlets which flows in a direction co-current with the movable bed in the first and second regeneration stages, and the gas from the gas inlet which flows in a direction countercurrent to the direction of movement of the movable bed in the third stage, and means for diverting at least part of the gas removed from the regenerator through the gas outlet to the gas inlet of the first regeneration stage and to the gas inlet of the second regeneration stage, the remainder of the gas from the regenerator gas outlet being removed from the system and subsequently treated to convert the sulfur dioxide into a useable product. Means, for example, gravity, for removing regenerated sorbent from the regenerator and means, for example, a pneumatic device or a bucket elevator, for feeding the regenerated sorbent into the top of the absorber, are provided in the system of the present invention.

Optionally, a lock hopper may be provided in the system for feeding a controlled amount of sorbent into the top of the absorber. In certain embodiments of the present invention, a lock hopper is optionally used for receiving spent sorbent from the absorber and feeding a controlled amount of the spent sorbent to the regenerator. In preferred embodiments, the lock hoppers are pressurized and depressurized as required, and the sorbent is moved intermittently throughout the system using the lock hoppers. Rotary valves, for example, are used to control and meter the movement of the movable beds. Suitable devices, such as "knife" gates and other opening and closing devices may be used throughout the system to control the movement of the beds. Commonly-known pneumatic or mechanical devices may also be used for continuously or intermittently propelling the beds of sorbent throughout the absorber, the regenerator, the lock hoppers and other parts of the system.

Gas inlets and outlets are normally constructed of steel alloy pipes, and suitable gas manifolds are used for uniformly distributing the respective gases throughout the absorber and the various stages of the regenerator. The absorber and regenerator vessels, as well as other parts of the system are generally made from various steel alloys. The vessels may also be refractory-lined. Either manually-controlled valves or automatically-controlled valves can be used for introducing the gases into the respective gas inlets of the regenerator and for metering the diluent, such as sulfur dioxide-containing off-gas, into the oxygen-containing gas to provide the suitable volume ratio discussed above. One skilled in the art can determine the optimal amounts of gas and the optimal rate at which the sorbents move throughout the system in order to achieve maximum desulfurization of hot gas and regeneration of spent sorbent.

Air compressors and suitable conduits connecting the air compressor to the gas inlets of the regenerator can be used by one skilled in the art. Any suitable oxygen supply can be used for those embodiments where air, pure oxygen or oxygen-enriched air are used. Suitable heat transfer means can be used for removing heat from the off-gas removed from the gas outlet of the regenerator.

The construction of the absorber and regenerator are not critical for the practice of the present invention. The absorber has to withstand a reducing atmosphere and must be constructed of materials that can withstand the temperature of the hot gas. The absorber is under a pressure of about 10 to about 40 atmospheres for most applications, however, pressures and temperatures can be varied, depending upon the particular gas being subjected to desulfurization. The absorber is provided with means for uniform distribution of the gas in the bed (inlet gas manifold) and a sorbent gas disengagement zone at the gas outlet. The regenerator must withstand oxidizing atmospheres only and generally operates at relatively low pressures. For example, it may operate at pressures ranging from ambient up to 10 or more atmospheres of pressure. The regenerator must be built of materials and be of suitable construction to withstand the exothermic reactions and temperatures discussed above. The regenerator has means for uniform distribution of the gas in the bed at the reactor inlets, means to ensure proper mixing between the gas outlet from the first stage and gas inlet into the second stage and a sorbent gas disengagement zone at the gas outlet, all of which are means and devices well-known to those skilled in the art.

The drawing shows a typical system where sorbent moves intermittently through lock hopper 6, absorber 2, lock hopper 8, regenerator 4, screening device 18 and sorbent conduit 22. Absorber 2 is under a pressure of about 10 to 40 atmospheres. Regenerator 4 is under a pressure of about 1 to 40 atmospheres. Sorbent conduit 22 is typically operated at atmospheric pressure, and lock hoppers 6 and 8 alternate at different pressures. Valves 24, 26, 30 and 32 are ball valves and are designed to withstand high pressure and temperature and to prevent gas leakage from a high pressure vessel into a vessel under lower pressure or into the atmosphere.

Referring to the drawing, stream 90 of regenerated sorbent 23 (metal oxide pellets) in sorbent conduit 22 is introduced through lock hopper 6 to the top of absorber 2 by gravity. Stream 90 may be any suitable system for propelling regenerated sorbent 23 from the bottom of regenerator 4 through sorbent conduit 22 to the top of absorber 2, or alternatively, to the top of lock hopper 6. For example, a suitable pneumatic device or mechanical elevator (not shown) may be used for moving sorbent 23 through sorbent conduit 22.

Makeup sorbent 21, when required, is added to conduit 22 by stream 78 from makeup silo 14. Makeup sorbent 21, that is, fresh sorbent such as fresh metal oxide, may be added to makeup silo 14 from a suitable source as shown by arrow 80. The amount of sorbent 23 which is elevated and moves into lock hopper 6 is controlled by rotary valve 34. Sorbent 23 in conduit 22 is under atmospheric pressure, and it moves through open valve 24 to lock hopper 6. Valve 26 is closed thus preventing gas leakage from absorber 2 into lock hopper 6 and preventing sorbent from flowing from lock hopper 6 into absorber 2. When sorbent in lock hopper 6 reaches a predetermined level, the flow of sorbent 23 in conduit 22 stops, and valve 24 closes. Lock hopper 6 is purged and then pressurized by inert gas or coal gas (not shown) to the pressure of absorber 2. Valve 26 opens when the pressure in lock hopper 6 is equal to the pressure in absorber 2. Sorbent moves from lock hopper 6 through conduit 42 into conduit 46 into absorber 2 by gravity and through valve 26. Concurrently, while conduit 54 is closed by valve 32, sulfided sorbent moves by the action of rotary valve 28 through conduit 48 through open valve 30 and into lock hopper 8 which is initially empty. By the time lock hopper 6 is empty, lock hopper 8 contains the same amount of sorbent that was initially in lock hopper 6. When lock hopper 6 is empty, valve 26 closes; lock hopper 6 is depressurized; and valve 24 opens, readying lock hopper 6 for a second batch of regenerated sorbent.

In absorber 2, the sorbent reacts with a stream of hot coal-derived fuel gas 84. The hot gas stream 84 enters the bottom of the absorber 2 through a suitable gas manifold which uniformly distributes the gas in absorber 2, and moves in a direction countercurrent to the direction of movement of sorbent in absorber 2. Thus, in the embodiment shown in the drawing, sorbent moves in the direction from valve 26 to valve 28, and hot gas moves from stream 84 to stream 86. As used herein, the bottom of absorber 2 is generally that area of the absorber located in the lower portion of the bed of sorbent above valve 28.

In the system shown in the drawing, a stream of hot fuel gas 82 from any source, such as a coal gasification plant (not shown) passes into primary particulate collector, such as cyclone 12, for the removal of particulate matter and thereafter passes by stream 84 into absorber 2. The desulfurized gas stream passes from the top of absorber 2, that is, from that area of the absorber where the upper-most part of the bed of sorbent is located, through stream 86 into a secondary particulate collector, such as cyclone 10, for removing particulate matter through suitable conduit 88 for utilization in any suitable system, such as a power plant.

In a typical coal gasification plant (not shown) coal is gasified so that it produces a fuel gas (a combustible gas) containing, for example, $CO_2$, $CO$, $H_2$, $H_2O$, optionally $N_2$, $H_2S$, $COS$ and the like. In absorber 2, the sorbent becomes spent or exhausted, that is, it becomes rich in sulfur, and passes through rotary valve 28 into conduit 48/52 by means of stream 50, through valve 30, typically a ball valve, and thereafter into lock hopper 8. Rotary feeder 28 stops when lock hopper 6 is empty, and when lock hopper 8 has about the same volume of sorbent as discharged for lock hopper 6. When the bed movement ceases, valve 30 closes lock hopper 8 which is under pressure and at a temperature similar to that of absorber 2, is depressurized, purged and pressurized again by means of inert gas or regeneration off-gas (not shown). Following pressurization by inert or regeneration off-gas, valve 32, e.g. a ball valve, opens.

From lock hopper 8 the spent sorbent passes through conduit 54 by gravity through open valve 32 into regenerator 4. The control of the movement of the spent sorbent from lock hopper 8 through conduits 54 and 56 is by rotary valve 34 at the bottom of regenerator 4. The action of rotary valve 34 moves the bed from lock hopper 8 to the top of regenerator 4. At the same time, regenerated sorbent discharges from the third stage of regeneration. Fines are separated by screen 18, and regenerated sorbent 23 moves into conduit 22 to be elevated back to the top of lock hopper 6. When lock hopper 8 is empty, rotary valve 34 closes. This stops the movement of the bed through the regenerator. Valve 32 at the bottom of lock hopper 8 closes. Lock hopper 8 is depressurized, purged and pressurized again by using inert gas or coal gas, to the pressure of the absorber. Valve 30 at the top of lock hopper 8 opens, and lock hopper 8 is already for another batch of spent sulfided sorbent.

Regenerator 4 has three zones therein shown as zone 36, zone 38 and zone 40. As shown in the drawing, the regenerator is approximately equally divided into the three zones, however, the size of each of the respective zones may vary according to the particular process and the desired reaction or activity carried out in each of the zones as explained above.

Zone 36 in regenerator 4 is the first phase regeneration zone or stage, and the spent sorbent which enters absorber 4 from lock hopper 8 reacts with a stream 94 of air 112 diluted with recycled off-gas stream 126. Gas from stream 94 enters the top of the regenerator, such as at the top of zone 36, through a suitable gas manifold 59 and passes in a direction which is co-current with the direction of movement of the sorbent being regenerated. In first phase regeneration zone 36, the spent sorbent becomes a partially reacted (sulfided) sorbent 58. In zone 36, part of the sorbent is converted to metal oxide sorbent, and the remainder is spent sorbent, thereby forming a partially-sulfided sorbent.

As the sorbent progressively moves through regenerator 4, it moves from zone 36 into zone 38 where a second stream 96 of air 114 is diluted with recycled off-gas stream 180. The second stream 96 of air diluted with recycled off-gas enters regenerator 4 at the top of zone 38 by an appropriate gas manifold 60 which uniformly distributes the gas into the top of zone 38. In zone 38, the stream 96 of air diluted with recycled off-gas passes in the direction of movement of the sorbent in a co-current direction, the movement of the sorbent being from conduit 56 in the direction of conduit 68 in regenerator 4. In zone 38, the oxygen in the air reacts with the spent sorbent so that regenerated sorbent 62 forms therein and passes to zone 40 in absorber 4. In zone 38, the remainder of the spent sorbent is converted to resuable metal oxide sorbent. Sorbent discharges from zone 38 at a controlled high temperature, e.g. about 800° C., which is sufficient for complete decomposition of all sulfates, such as zinc sulfate. Thus, the metal oxide discharges from zone 38 in mostly regenerated form (about 95 to about 100% regenerated), and it contains no sulfate.

A stream of air 166 passes into the bottom of absorber 4, that is, into the bottom of zone 40 through valve 118, in the region of conduit 68 where sorbent passes from absorber 4, and cools the regenerated sorbent and purges the gases, such as sulfur dioxide gas, from the regenerated sorbent. Air stream 116 also ensures a completion of the oxidation reaction, which, in all cases will be minimal in zone 40. Regenerated sorbent passes from regenerator 4 through conduit 68 and conduit 70 by stream 72. The movement of the bed from absorber 4 is controlled by rotary valve 34 as described above. As sorbent stream 72 passes from regenerator 4, it is classified in classifier 16 to remove finely-divided sorbent, for example, dust, through stream 76 into storage area 20. A suitable screen 18 of appropriate mesh size can be used in classifier 16 to separate the fines from the reusable or regenerated sorbent. The regenerated sorbent 23 then passes to the top of absorber 2 by the mechanical elevator, pneumatic system or other propulsion device as discussed above.

Air stream 116 as it flows into the bottom of zone 40 in regenerator 4 passes in a direction countercurrent to the direction of the movement of the sorbent in absorber 4. Thus, air stream 116 passes from the bottom of absorber 4 toward the top of absorber 4 until it meets the gases flowing from streams 94 and 96, at which point the gases exit through off-gas stream 98. The gas outlet for off-gas stream 98 is generally located between the bottom of zone 38 and the top of zone 40 to collect the merging gas streams from absorber 4.

When a fresh batch of regenerated sorbent is fed into lock hopper 6, and valve 24 is closed and valve 26 is opened, a slip stream 92 of fuel gas lean in sulfur flows through lock hopper 6 from absorber 2 through conduit 46 into conduit 42 and thereafter into lock hopper 6 where the stream of hot desulfurized gas chemically reduces the sorbent. For example, if $Fe_2O_3$ is present, it is reduced to $Fe_3O_4$ by the action of hydrogen in the hot, sulfur-lean fuel gas. If $ZnSO_4$ is present, it is chemically reduced to $ZnO$, $ZnS$, $H_2S$ and $SO_2$. Slip stream 92 operates by opening a control valve (not shown) after the loading of lock hopper 6 with regenerated sorbent 23, and the reusable metal oxide is held in lock hopper 6 until such time that low sulfur dioxide concentration is detected in stream 92. Thus, a slip stream of the hot gas which is lean in sulfur compounds is passed through the regenerated metal oxide whereby residual metal sulfate compounds in the regenerated metal oxide are decomposed to sulfide, and sulfur dioxide and oxidized regenerated metal oxide is chemically reduced to the oxide form of the sorbent. Stream 92 can be cycled to product stream 140 or treated separately.

In the embodiment shown in the drawing, the regeneration reaction in zones 36 and 38 in regenerator 4 is very exothermic and is accomplished in regenerator 4 in two stages wherein two stream of oxygen-containing gas containing non-reactive diluent pass in a direction co-current with the direction of flow of the sorbent in regenerator 4. The oxygen concentration in streams 94 and 96 is controlled so that the temperature of the sorbents in regenerator 4 does not exceed the allowable level above which sintering of the sorbent occurs. The oxygen concentration in stream 94 is lower than the oxygen concentration in stream 96 since the oxygen in stream 94 reacts with a more highly sulfided sorbent while stream 96 reacts with a partially-reacted or partially-regenerated sorbent. The reaction rate in the second regeneration zone 38 is slower, and therefore, the oxgen concentration in oxygen-containing stream 96 can be higher than the oxygen concentration in oxygen-containing stream 94. The regeneration in zone 38 preferably occurs with a slight stoichiometric excess of oxygen to insure complete regeneration of the sorbent.

The sorbent and the gas move from the second phase regeneration zone 38 at a temperature above which any sulfates formed during the reactions is not stable, that is, at about 700° C. and above. The hot sorbent as it passes from zone 38 is cooled in zone 40 of regenerator 4 to a temperature which will not be detrimental to rotary valve 34, by air stream 116. The air which originates at stream 116 flows in a direction in zone 40 of regenerator 4 which is countercurrent to the direction of movement of sorbent in absorber 4. The air stream in zone 40 also purges the sulfur dioxide-rich gas from the voids in the bed of sorbent in zone 40 so that a cooled, fully regenerated sorbent is removed as stream 72 and discharges at the bottom of the regenerator 4.

Although it is not shown in the drawing, a lock hopper and associated ball valves can be used in the area of conduit 68 and prior to screening device 18 to provide means for pressurizing regenerator 4, e.g., for pressurizing regenerator 4 at a pressure of 15 lbs/sq. inch gauge or higher, as desired.

Gas stream 98, generally defined herein as off-gas or recycle gas, is a mixture of the gas of streams 94, 96 and 116 after the regeneration reaction has occurred in absorber 4. Off-gas stream 98 is hot, and generally has a temperature of about 750° C. to 800° C. or higher, depending on the reaction conditions, the sorbent being regenerated and other conditions within the system. Off-gas stream 98 is low in oxygen (about 0.5 to about 2 percent by volume) and rich in sulfur dioxide (about 10 to about 13 percent when air is used as the source of oxygen and higher if oxygen-enriched air is used up to about 100% if pure oxygen is used). Generally, the balance of off-gas stream 98 is nitrogen.

Dry compressed air (or alternatively, oxygen-enriched air or pure oxygen) stream 104 is the source of oxygen for the regeneration in the system shown in the drawing. The air from compressor 100 after it passes through a gas dryer 102 in stream 104 is heated in coil 108 in heat exchanger 106 to approximately 400° C. at exchanger unit 104. Air stream 110 heated at about 300° C. is then split into air streams 112, 114 and 116. The volume flow ratio between air stream 112 and recycle off-gas stream 126 determines the oxygen concentration of stream 94. The particular oxygen concentration of stream 94 is determined by the desired temperature in regeneration zone 36. The volume flow ratio between air stream 114 and recycle off-gas stream 180 determines the oxygen concentration of stream 96 where the oxygen concentration is determined by the desired temperature in second phase regeneration zone 38 of regenerator 4.

Heat exchangers 130, 106 and 148 are designed to recover the heat of regeneration. Various heat recovery systems and processes may be used in the present invention, and the heat recovery system shown in the drawing is for exemplary purposes only.

Recycle compressor 164 operates at a low inlet temperature of about 90° C. to reduce power consumption. As seen in the drawing, recycle gas stream 158 passes from heat exchanger (boiler) 148 where the gas stream has been cooled to the desired temperature. A stream of water 152 passes through the coil 154 in heat exchanger 148 and passes from the boiler of heat exchanger 148 in the form of a stream 156 of steam. Recycle gas stream 158 passes through a suitable filter 160 through conduit 162 into recycle compressor 164 where a discharge recycle gas stream 166 passes to heat exchanger 130 through conduit 172 where the stream is heated in heating coil 134 to about 400° C. to about 500° C. by the heat removed from hot stream 128 in heat exchange coil 132, which stream originates from the stream of regenerator off-gas 98 at a temperature generally in excess of 700° C. (usually above about 500° C. and below about 825° C.). The resultant stream 176 passes from heat exchanger 130 through conduit 174 and is recycled back to the regenerator 4 through conduit 178 and is split into gas streams 180 and 126 to be used as a diluent for air derived from stream 110. Startup heater 170 may be used to re-heat gas stream 166 initially or to supplement the heat contributed by heat exchanger 130.

Product gas stream 140 exits through conduit 142 and is rich in sulfur dioxide. This stream of gas can be used for any desired purpose as discussed above in the background of the invention. When air is used as a source of oxygen for the regeneration of sorbent in absorber 4, product gas stream 140 contains about 10 to about 13 percent sulfur dioxide. Higher sulfur dioxide concentrations are attainable in the process and system of the present invention when oxygen-enriched air or pure oxygen are used as the source of oxygen-containing gas.

The example below is given for the purpose of illustrating the invention and is not intended to define or limit the scope of the invention but is merely given for exemplifying the manner contemplated for practicing the invention.

EXAMPLE

Illinois #6 coal-derived fuel gas from a typical air blown fixed bed gasifier is passed through the absorber of a system as shown in the accompanying drawing and discussed in detail above for sulfur removal. The gas contains mainly 29% $H_2O$, 31% $N_2$, 8% CO, 11% $CO_2$, 17% $H_2$ and 3.3% $CH_4$. Sulfur concentration, in $H_2S$ and COS form, varies in the range of 3000-5000 ppmv. The gas is at about 600° C. and 20 atmospheres. The sorbent is 3-5 mm pelletized zinc ferrite, $ZnFe_2O_4$, containing 2-5% binder material. The $H_2S$ and COS in the coal-gas stream 84 react with the zinc ferrite bed of absorber 2 and their combined concentration is reduced to below 10 ppmv.

The regenerated zinc ferrite which is fed to lock hopper 6 contains less than 1% zinc sulfate. A slip stream of desulfurized coal gas flows from the top of the absorber through lock hopper 6 and reacts with the regenerated sorbent according to the following equations:

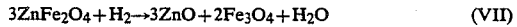  (VII)

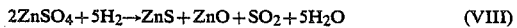  (VIII)

Sulfur dioxide is present in slip stream 92 until a complete decomposition of zinc sulfate is achieved. The chemically reduced sorbent from lock hopper 6 is fed to absorber 2 where it reacts with the coal gas according to equations (IV)-(VI). The reduced form of iron oxide, $Fe_3O_4$, reacts according to the following equation:

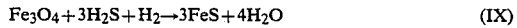  (IX)

The sulfided sorbent discharges from the bottom of absorber 2 through lock hopper 8 to the top of the first regeneration zone 36 at about 500°-600° C. where it reacts with regeneration gas stream 94. Gas stream 94 is at about 500° C., 2 atmospheres and contains about 2-3% oxygen. The amount of oxygen in gas stream 94 is sufficient for 15-20% oxidation of the sulfided sorbent. The oxidation consumes oxygen and forms sulfur dioxide by the following reactions:

  (X)

  (XI)

The heat of reaction in first regeneration zone 36 heats the gas to 650°-700° C. while heating the sorbent to a maximum of about 800° C. Zince sulfate is formed at the low temperature of zone 36 inlet but decomposes at the higher temperature of the outlet according to the equation:

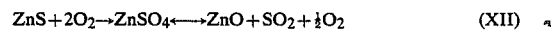  (XII)

Regeneration gas stream 96 reacts with the partially sulfided sorbent in second reaction zone 38. It is at about 500° C., 2 atmospheres and contains about 4-5% oxygen. The amount of oxygen is 1-5% above the stoichiometric amount required for complete oxidation of the sorbent. The heat of reaction in the second regeneration zone 38 heats the gas to 750°-800° C. while heating the sorbent to a maximum of about 815° C. Air stream 116 at 350°-450° C. and 2 atmospheres, flows to the bottom of the third regeneration zone 40. It cools the sorbent, purges it of sulfur dioxide containing gases and completes regeneration of traces of metal sulfide. Stream 98 is a single outlet stream at about 800° C. containing about 13% $SO_2$, 0.5-1% $O_2$ and the balance $N_2$. Oxygen concentration in stream 94 is maintained by 10-15 volumetric flow ratio between off-gas stream 126 and air stream 112, and the oxygen concentration of stream 96 is maintained by 5-8 volumetric flow ratio between off-gas stream 180 and air stream 114. Product stream 140 contains about 13% $SO_2$, 0.5-1% $O_2$, and the balance $N_2$.

By the process and system of preferred embodiments of the present invention, the off-gas which is rich in sulfur dioxide, after it is cooled, is returned to the process and ultimately further enriches the product. The concentration of the off-gas in the oxygen-containing streams supplied to the first and second stages of the regeneration controls the temperature in the respective movable beds in the regenerator. If the temperature of a particular bed in the regenerator becomes too high, for example, approaches the sintering temperature of the sorbent therein, the flow of off-gas diluent is increased to decrease the oxygen concentration in the inlet gas stream, and if the temperature of a particular bed in the regenerator becomes too low, for example, the regeneration of the spent sorbent is insufficient or incomplete therein, the flow of air, oxygen-enriched air or oxygen is increased to increase the oxygen concentration in the inlet gas stream. These adjustments in oxygen concentration can be made by monitoring temperatures in the regenerator. Furthermore, by the process and system of the present invention sulfate formation is minimized by the high temperature of the sorbent exiting from zone 38 of regenerator 4 and by the sulfate decomposition and removal steps in lock hopper 6 as discussed above.

While other modifications of the invention and variations thereof which may be employed within the scope of the invention, have not been described, the invention is intended to include such modifications as may be embraced within the following claims.

What is claimed is:

1. A method for removing hydrogen sulfide and other sulfur compounds from a hot gas consisting essentially of the steps of:
    (a) contacting the hot gas with at least one metal oxide sorbent in a packed, non-fluidized bed of metal oxide sorbent which moves countercurrently to the hot gas, whereby the metal oxide sorbent reacts with the hydrogen sulfide and other sulfide compounds to form a sulfur-rich metal sorbent and a hot gas lean in sulfur compounds;
    (b) removing the hot gas lean in sulfur from the bed of metal oxide sorbent;
    (c) contacting the sulfur-rich metal sorbent with a first oxygen-containing gas which moves non-fluidized bed of the sulfur-rich metal sorbent in a first phase regeneration to convert sulfur-rich metal sorbent to a partially-sulfided sorbent, thereby forming a sulfur dioxide containing gas;
    (d) contacting the partially-sulfided metal sorbent with a second oxygen-containing gas which moves co-currently in the direction of a movable, packed, non-fluidized bed of the partially-sulfided metal sorbent in a second phase regeneration to convert the partially-sulfided metal sorbent to regenerated metal oxide and thereby forming additional sulfur dioxide-containing gas, the first oxygen-containing gas having a concentration of oxygen which is less than the concentration of oxygen in the second oxygen-containing gas;
    (e) contacting the regenerated metal oxide with air, oxygen-enriched air or oxygen which moves countercurrently to the direction of a movable, packed, non-fluidized bed of the regenerated metal oxide to convert any remaining sulfided metal sorbent to regenerated metal oxide, to cool the regenerated metal oxide or to purge the regenerated metal oxide of sulfur dioxide-containing gas;
    (f) removing the sulfur dioxide-containing gas purged from the regenerated metal oxide; and
    (g) re-using the regenerated metal oxide in step (a).

2. The method of claim 1 further comprising passing a slip stream of the hot gas lean in sulfur compounds through regenerated metal oxide whereby residual metal sulfate compounds in the regenerated metal oxide are decomposed, and oxidized regenerated metal oxide is chemically reduced.

3. The method of claim 1 further comprising controling the oxygen concentration of the first oxygen-containing gas and the second oxygen-containing gas with cooled, sulfur dioxide-containing gas purged from the regenerated metal oxide and removing excess suflur dioxide-containing gas as a product stream.

4. The method of claim 3 further comprising adding sulfur dioxide-containing gas purged from the regenerated meal oxide to an oxygen-containing gas and maintaining the volume flow ratio between the oxygen-containing gas and the sulfur dioxide-containing gas purged from the regenerated metal oxide to provide a sufficient amount of oxygen in the first oxygen-containing gas to maintain the temperature of the sorbent in the first phase regeneration below the sintering temperature of the sulfur-rich metal sorbent.

5. The method of claim 3 wherein the volume flow ratio between the oxygen-containing gas and the sulfur dioxide-containing gas provides a sufficient amount of oxygen in the first oxygen-containing gas to maintain the temperature in the first phase regeneration at about 600° C. to about 850° C.

6. The method of claim 5 wherein the volume flow ratio is from about 3 to 5 parts to about 20 to 30 parts by volume sulfur dioxide-containing gas to about 1 part by volume oxygen-containing gas.

7. The method of claim 3 further comprising adding sulfur dioxide-containing gas purged from the regenerated metal oxide to an oxygen-containing gas and maintaining the volume flow ratio between the oxygen-containing gas and the sulfur dioxide-containing gas purged from the regenerated metal oxide to provide a sufficient amount of oxygen in the second oxygen-containing gas to maintain the temperature of the sorbent in the second phase regeneration below the sintering temperature of the sulfur-rich metal sorbent.

8. The method of claim 3 wherein the volume flow ratio between the second oxygen-containing gas and the sulfur dioxide-containing gas provides a sufficient amount of oxygen in the second oxygen-containing gas to convert the partially-sulfided metal sorbent substantially to metal oxide while maintaining the temperature in the second phase regeneration at about 600° C. to about 850° C.

9. The method of claim 8 wherein the volume flow ratio is from about 3 to 5 parts to about 20 to 30 parts by volume sulfur dioxide-containing gas to about 1 part by volume oxygen-containing gas.

10. The method of claims 1 or 3 wherein the oxygen-containing gas is air, oxygen-enriched air or pure oxygen.

11. The method of claims 1 to 3 wherein the temperature of the first oxygen-containing gas at the inlet and the temperature of the second oxygen-containing gas at the inlet is about 400° C. to about 500° C.

12. The method of claim 1 wherein the sulfur dioxide-containing gas purged from the regenerated metal oxide is a mixture of the sulfur dioxide-containing gas from the first phase regeneration, the sulfur dioxide-containing gas from the second phase regeneration and the air used to cool the regenerated metal oxide and to purge the regenerated metal oxide of sulfur dioxide-containing gas.

13. The method of claims 1 or 12 wherein the sulfur dixode-containing gas purged from the regenerated metal oxide contains about 10 to 13% by volume sulfur dioxide up to 100% by volume sulfur dioxide.

14. The method of claim 1 further comprising cooling the sulfur dioxide-containing gas purged from the regenerated metal oxide and recycling at least a portion of cooled sulfur-dioxide-containing gas to dilute the oxygen in the first oxygen-containing gas and the second oxygen-containing gas.

15. The method of claim 1 wherein the metal oxide sorbent is selected from the group consisting of iron oxide, zinc oxide, zinc ferrite, copper ferrite, copper oxide and vanadium oxide.

16. The method of claim 1 wherein the hot gas containing hydrogen sulfide and other sulfide compounds is a coal gas having a temperature of at least about 400° C., and the temperature at which the hot gas contacts the metal oxide sorbent, is the temperature of the hot gas.

17. The method of claim 1 further comsisting essentially of the step of passing the sulfur-rich metal sorbent from the movable, packed, non-fluidized bed of metal oxide sorbent in a first vessel to a second vessel wherein the movable, packed, non-fluidized bed first passes through a first phase regeneration to a second phase regeneration and thereafter to a cooling and purging phase before the regenerated metal oxide passes from the second vessel.

18. The method of claim 1 wherein the metal oxide sorbent, the sulfur-rich metal sorbent, the partially-sulfided metal sorbent and the regenerated metal oxide move intermittently in a packed, non-fluidized bed.

19. The method of claim 1 wherein the metal oxide sorbent, the sulfur-rich metal sorbent, the partially-sulfided metal sorbent and the regenerated metal oxide move continuously in a packed, non-fluidized bed.

20. A method of converting an absorption mass from a spent metal-sulfur compound to a form comprising a re-usable metal oxide consisting essentially of the steps of:
   (a) moving a packed, non-fluidized bed of the spent metal-sulfur compound progressively through a single regeneration vessel having a first regeneration stage, a second regeneration stage and a third cooling and purging stage;
   (b) introducing a first oxygen-containing gas into the first regeneration stage and moving the first oxygen-containing gas in the packed, non-fluidized bed in the first regeneration stage in a direction which is co-current with the direction of movement of the spent metal sulfur compound to form, in an exothermic reaction, gaseous sulfur compound and partially spent metal-sulfur compound;
   (c) introducing a second oxygen-containing gas into the second regeneration stage and moving the second oxygen containing gas in the packed non-fluidized bed in the second regeneration stage in a direction which is co-current with the direction of movement of the partially spent metal sulfur compound to form, in an exothermic reaction, additional gaseous sulfur compound and reusable metal oxide, the second oxygen-containing gas having an oxygen concentration greater than the oxygen concentration of the first oxygen-containing gas;
   (d) introducing oxygen-containing gas and the reusable metal oxide into the third cooling and sulfate decomposition stage and passing the oxygen-containing gas in the packed, non-fluidized bed in a direction which is countercurrent to the direction of movement of the reusable metal oxide whereby the reusable metal oxide is cooled and purged of gaseous sulfur compound, and residual spent metal sulfur compound is completely convertd to reusable metal oxide; and
   (e) removing the reuseable metal oxide and the gaseous sulfur compound from the regenerator.

21. The method of claim 20 further comprising adding gaseous sulfur compound removed from the regenerator to the first and second oxygen-containing gases whereby the gaseous sulfur compound is a diluent and reduces the oxygen concentration of the oxygen-containing gases.

22. The method of claim 21 comprising establishing a volume flow ratio between the first oxygen-containing gas and the gaseous sulfur compound to provide a sufficient amount of oxygen in the first oxygen-containing gas to control the temperature of the exothermic reaction in the first regeneration stage.

23. The method of claim 22 wherein the volume flow ratio of gaseous sulfur compound to the first oxygen-containing gas is sufficient to maintain the temperature of the moving bed of spent metal-sulfur compound in the first regeneration stage below the sintering temperature of the metal-sulfur compound and reuseable metal oxide formed therefrom.

24. The method of claim 23 wherein the volume flow ratio is from about 3 to 5 parts to about 20 to 30 parts by volume gaseous sulfur compound to about 1 part by volume oxygen-containing gas.

25. The method of claim 21 comprising establishing a volume flow ratio between the second oxygen-containing gas and the gaseous sulfur compound to provide a sufficient amount of oxygen in the second oxygen-containing gas to control the temperature of the exothermic reaction in the second regeneration stage.

26. The method of claim 25 wherein the volume flow ratio of gaseous sulfur compound to the second oxygen-containing gas is sufficient to maintain the temperature of the movable bed of partially spent metal-sulfur compound in the second regeneration stage below the sintering temperature of the metal-sulfur compound and reusable metal oxide formed therefrom.

27. The method of claim 26 wherein the volume flow ratio is from about 3 to 5 parts to about 20 to 30 parts by volume gaseous sulfur compound to about 1 part by volume oxygen-containing gas.

28. The method of claims 20 or 21 wherein the first oxygen-containing gas and the second oxygen-containing gas are derived from air, oxygen-enriched air or pure oxygen.

29. The method of claims 20 or 21 wherein the gaseous sulfur compound comprises about 10 to 13 percent by volume sulfur dioxide up to 100 percent by volume sulfur dioxide.

30. The method of claim 20 wherein the spent metal-sulfur compound is a compound which is the reaction product between a metal oxide and at least one sulfur compound selected from the group consisting of hydrogen sulfide, carbonyl sulfide and carbon disulfide.

31. The method of claim 30 wherein the metal oxide is selected from the group consisting of iron oxide, zinc oxide, zinc ferrite, copper ferrite, copper oxide and vanadium oxide.

32. The method of claim 21 further comprising cooling the gaseous sulfur compound removed from the regenerator prior to adding the gaseous sulfur compound as diluent to the first and second oxygen-containing gases.

33. The method of claim 21 wherein the packed, non-fluidized bed of spent metal-sulfur compound and the reusable metal oxide move intermittently in the regeneration vessel.

34. The method of claim 21 wherein the packed, non-fluidized bed of spent metal-sulfur compound and the reusable metal oxide move continuously in the regeneration vessel.

35. A method for the desulfurization of hot gas with sorbent which reacts with sulfur compounds in the hot gas, comprising
   (a) passing the hot gas containing the sulfur compound through a movable, packed, non-fluidized bed of sorbent which reacts with the sulfur compounds, in a direction countercurrent to the direction of movement of the movable, packed non-fluidized bed of sorbent in an absorber whereby the sulfur compounds react with the sorbent to form a sulfur-rich sorbent and a sulfur-depleted hot gas;

(b) removing the sulfur-depleted hot gas from the absorber;

(c) transferring the sulfur-rich sorbent from the absorber to a single regenerator vessel having a first regeneration stage, a second regeneration stage and a third cooling and purging stage;

(d) introducing a first oxygen-containing gas into the first regeneration stage and passing the first oxygen-containing gas in a direction cocurrent with the direction of movement of the packed, non-fluidized bed of sulfur-rich sorbent in the first regeneration stage, whereby gaseous sulfur compound and partially sulfur-depleted sorbent are formed by an exothermic reaction between oxygen in the oxygen-containing gas and sulfur in the sulfur-rich sorbent;

(e) moving the packed, non-fluidized bed of partially sulfur-depleted sorbent into the second regeneration stage;

(f) introducing a second oxygen-containing gas into the second regeneration stage and passing the second oxygen-containing gas in a direction cocurrent with the direction of movement of the packed, non-fluidized bed of partially sulfur-depleted sorbent in the second regeneration stage, whereby additional gaseous suflur compound and reusable sulfur-depleted sorbent are formed by an exothermic reaction between oxygen in the oxygen-containing gas and sulfur in the partially sulfur-depleted sorbent;

(g) moving the packed, non-fluidized bed of reusable sulfur-depleted sorbent into the cooling and purging stage in the regenerator;

(h) introducing a gaseous cooling and purging medium containing oxygen into the cooling and purging stage of the regenerator and passing the cooling and purging medium in a direction countercurrent to the direction of movement of the movable, packed, non-fluidized bed of reusable sulfur-depleted sorbent, whereby the reusable sulfur-depleted sorbent is cooled and purged of gaseous sulfur compound, and residual sulfur-rich sorbent is completely converted to reusable sulfur-depleted sorbent;

(i) removing the reusable sulfur-depleted sorbent from the regenerator;

(j) passing the reusable sulfur-depleted sorbent to the absorber to replenish the movable, packed, non-fluidized bed of sorbent which reacts with the sulfur compounds in the hot gas;

(k) removing gaseous sulfur compound from the regenerator;

(l) adding a portion of the gaseous sulfur compound removed from the regenerator to a source of oxygen-containing gas to form the first oxygen-containing gas;

(m) adding a portion of the gaseous sulfur compound removed from the regenerator to a source of oxygen-containing gas to form the second oxygen-containing gas;

(n) removing excess gaseous sulfur compound; and (o) controlling the temperature of the exothermic reactions in the first regeneration stage and the second regeneration stage by adjusting the volume flow ratio of the gaseous sulfur compound and the source of oxygen-containing gas in the first oxygen-containing gas and the second oxygen-containing gas.

36. The method of claim 35 wherein the sorbent which reacts with the sulfur compounds, is selected from the group consisting of iron oxide, zinc oxide, zinc ferrite, copper ferrite, copper oxide and vanadium oxide.

37. The method of claim 35 wherein the hot gas is a coal gas having a temperature of at least about 400° C., and the temperature at which the sulfur compounds in the hot gas react with the sorbent, is substantially the temperature of the hot gas.

38. The method of claim 35 wherein the cooling and purging medium is a source of oxygen-containing gas.

39. The method of claims 35 or 26 wherein the source of oxygen-containing gas is air, oxygen-enriched air or oxygen.

40. The method of claim 35 comprising establishing a volume flow ratio between the gaseous sulfur compound and source of oxygen-containing gas to provide a sufficient amount of oxygen in the first regeneration stage to maintain the temperature of the sulfur-depleted sorbent in the first regeneration stage below the sintering temperature of the sulfur-depleted sorbent and establishing a volume flow ratio between the gaseous sulfur compound and the source of oxygen-containing gas to provide a sufficient amount of oxygen in the second oxygen-containing gas to maintain the temperature of the movable bed of partially sulfur-depleted sorbent in the second regeneration stage below the sintering temperature of the partially sulfur-depleted sorbent and reusable sorbent formed therefrom.

41. The method of claims 35 or 38 wherein the volume flow ratio is from about 3 to 5 parts to about 20 to 30 parts by volume gaseous sulfur compound to about 1 part by volume oxygen-containing gas.

42. The method of claim 35 further comprising passing a slip stream of the sulfur-depleted hot gas through the reusable sulfur-depleted sorbent in a lock hopper whereby residual metal sulfate compounds in the reusable sulfur-depleted sorbent are decomposed, and oxidized reusable sulfur-depleted sorbent is chemically reduced.

43. The method of claim 35 wherein the sorbent which reacts with sulfur compounds, the sulfur-rich sorbent, the partially sulfur-depleted sorbent and the reusable sulfur-depleted sorbent move intermittently in a packed, non-fluidized bed.

44. The method of claim 35 wherein the sorbent which reacts with sulfur compounds, the sulfur-rich sorbent, the partially sulfur-depleted sorbent and the reusable sulfur-depleted sorbent move continuously in a packed, non-fluidized bed.

* * * * *